April 3, 1928.
B. HEINRICHS
1,664,413
CUTTING AND PERFORATING MECHANISM
Original Filed Jan. 9, 1922  4 Sheets-Sheet 2
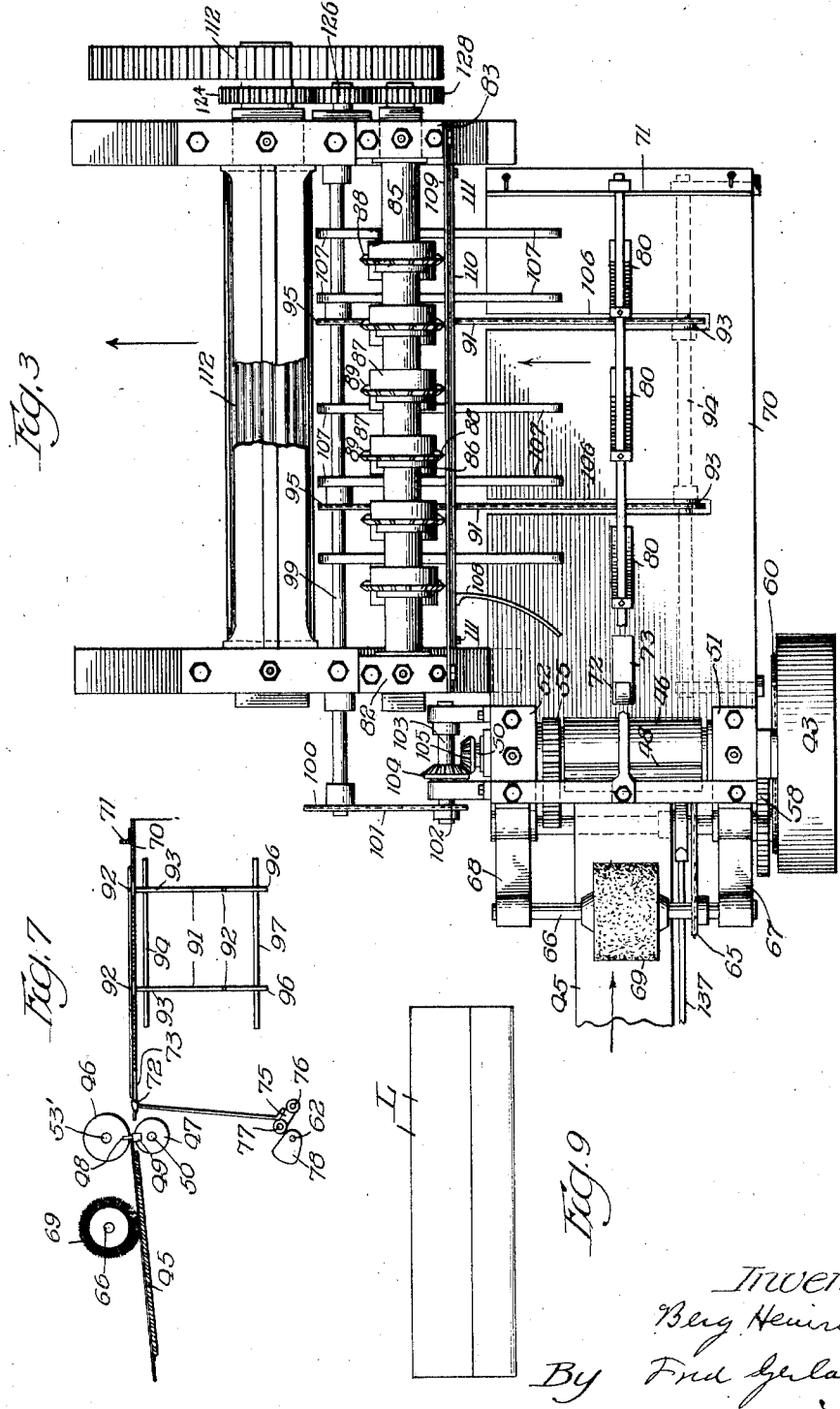

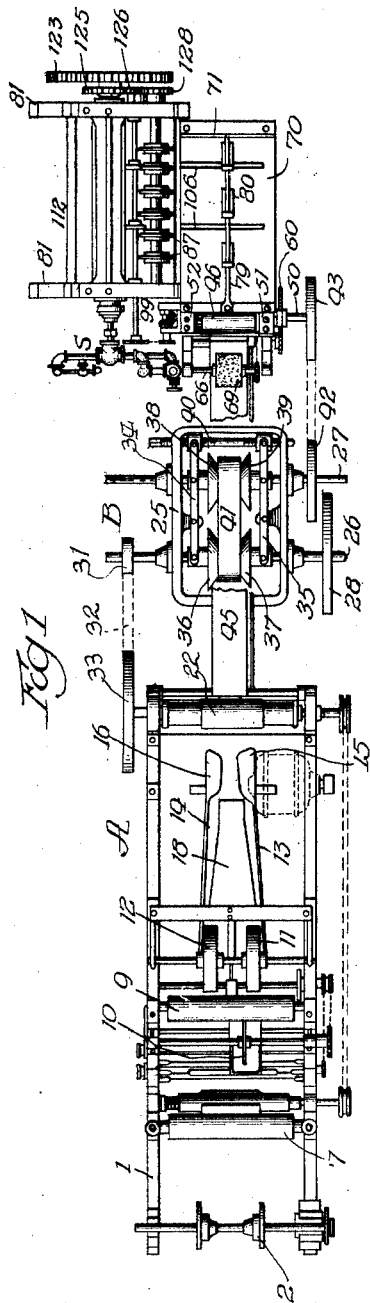

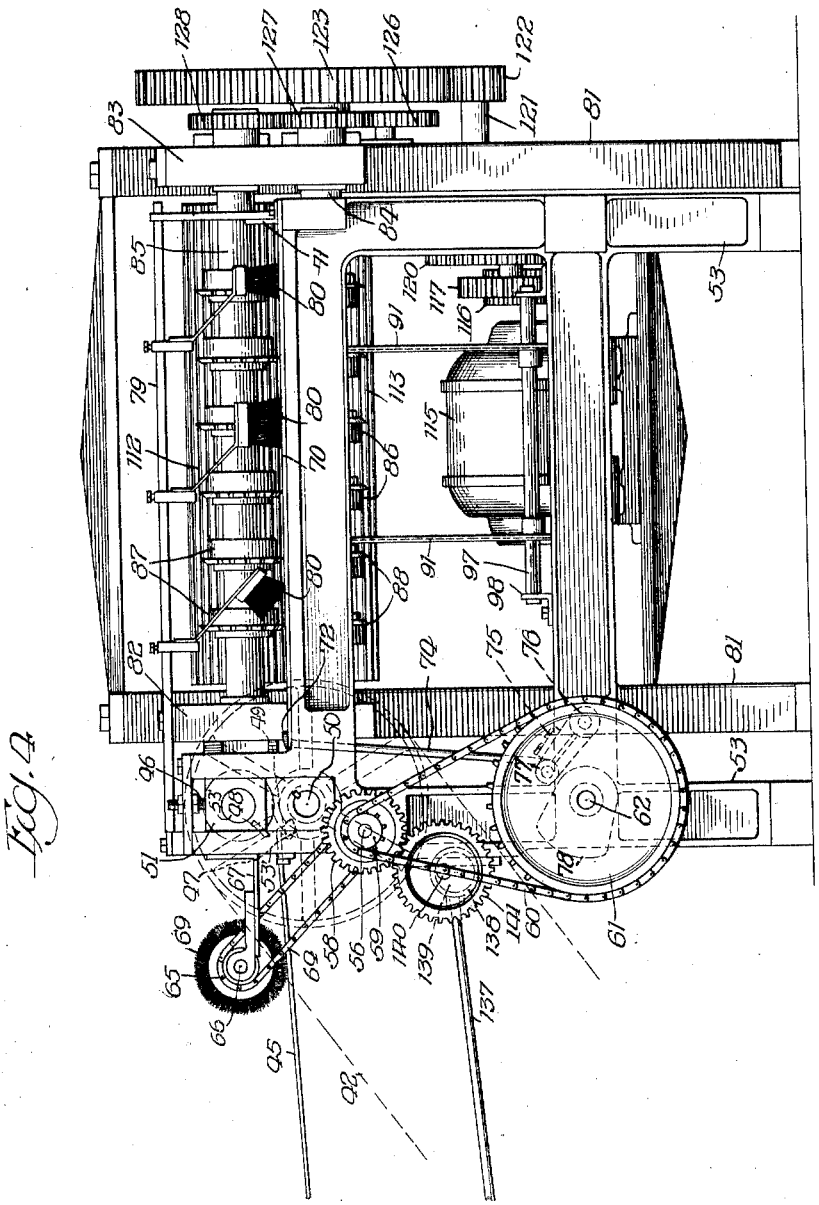

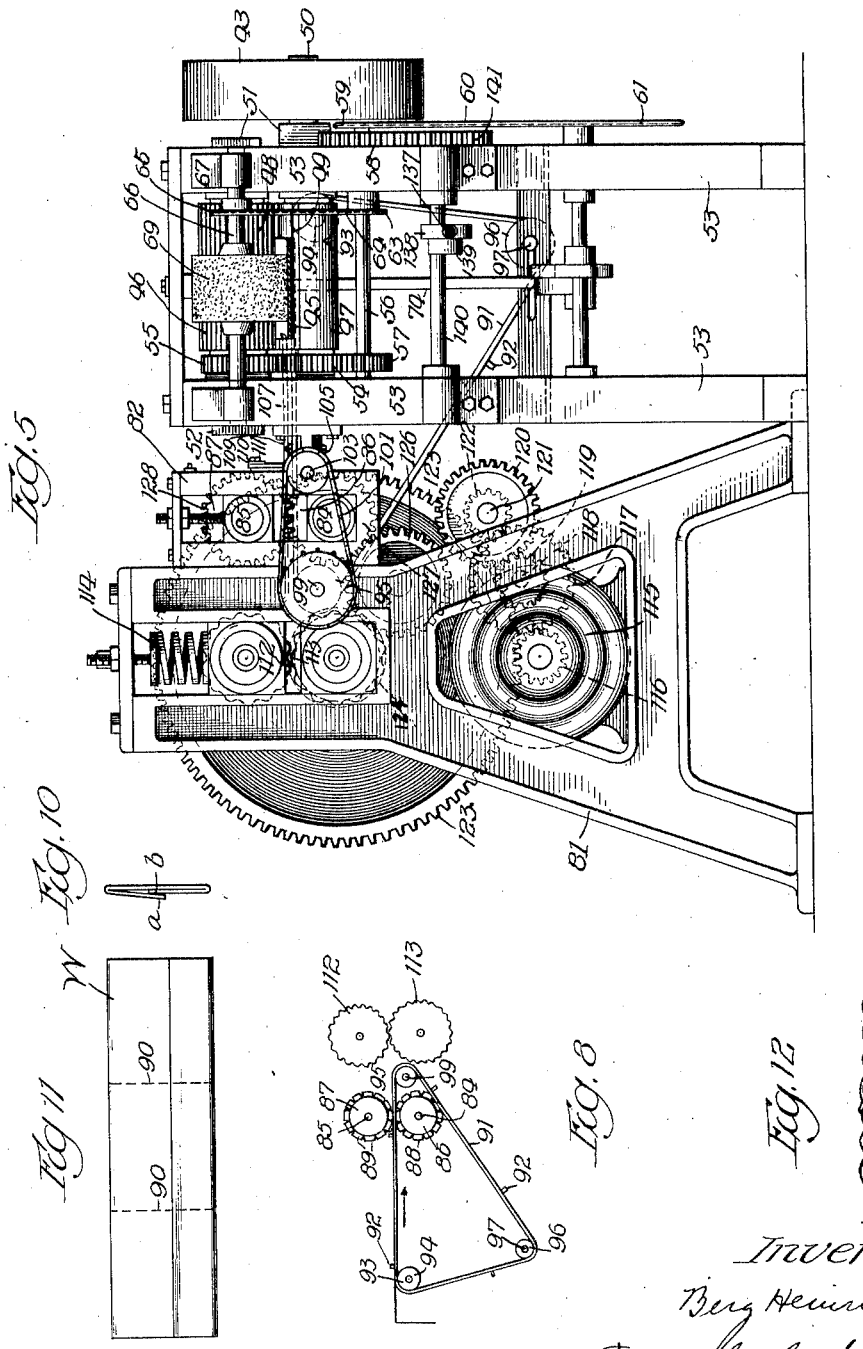

Patented Apr. 3, 1928.

1,664,413

UNITED STATES PATENT OFFICE.

BERG HEINRICHS, OF CHICAGO, ILLINOIS, ASSIGNOR TO MID-WEST BOX COMPANY, OF ANDERSON, INDIANA, A CORPORATION OF INDIANA.

CUTTING AND PERFORATING MECHANISM.

Original application filed January 9, 1922, Serial No. 527,819. Divided and this application filed November 10, 1924. Serial No. 748,856.

The invention relates to cutting and perforating mechanism, and more particularly to that mechanism which is used in connection with the machine for making tubular corrugated wrappers for holding and protecting incandescent lamps and other articles.

This application is a division of the application filed by me January 9, 1922, and serially numbered 527,819.

The object of the invention is to provide improved mechanism which will cut a flattened tube or strip in the form of a continuous web or band into longitudinal lengths, and then perforate or slit it transversely.

A further object of the invention is to provide mechanism of this type which is practical and efficient.

The invention consists in the several novel features hereinafter set forth and more particularly defined by claims at the conclusion hereof.

In the drawings: Fig. 1 is a plan view of the improved cutting and perforating mechanism shown in connection with a wrapper forming machine. Fig. 2 is a side elevation of the parts shown in Fig. 1. Fig. 3 is a plan view of the new and improved cutting and slitting mechanism. Fig. 4 is a side elevation of the invention. Fig. 5 is an end elevational view of the parts disclosed in Figs. 3 and 4. Fig. 6 is a diagrammatic side elevation of the wrapper forming machine shown in Fig. 1, with which the improved cutting and perforating mechanism is adapted to be used. Fig. 7 is a diagrammatic side elevation of the new and improved cutting mechanism. Fig. 8 is a diagrammatic side elevation of the mechanism for conveying, perforating, and corrugating the flattened tube after it has been cut into lengths by the cutting mechanism. Fig. 9 is a plan view of a section or length of the corrugated tube after it has been severed from the continuous web by the cutting mechanism. Fig. 10 is an end view of the length shown in Fig. 9. Fig. 11 is a plan view of a section or length after it has been transversely slit or perforated by the new and improved slitting mechanism. Fig. 12 is a side elevation of the finished wrapper or carton.

The invention is exemplified with a machine which comprises a unit A which prints, folds, glues and propels a paper web from which wrappers are made, and mechanism comprising a unit B which provides power transmission to the various operating parts of the unit A, and also to the new and improved cutting mechanism.

The unit A is supported by a frame-work 1 on which is mounted a carrier 2 for supporting a continuous web of paper 3 from which the wrappers are formed by the unit A. As disclosed in the application aforementioned, the paper travels from the carrier 2 around a roll 4 adjacent which is a printing roller 5 which is secured on shaft 6. The paper then travels around idler rollers 7 and 8 and from there around a roller 9 where a gluing disk 10 engages the paper. The paper then travels around a pair of guide rollers 11 and 12 which are spaced apart and which are adapted to guide the paper to the folding mechanism. The folding mechanism comprises a pair of folding rails 13 and 14 which are convergent away from the wheels 11 and 12 and which at their outer ends have infolding wings 15 and 16 respectively. Over the folding rails, a presser 18 is disposed to hold the paper or web upon the rails. The infolding wings 15 and 16 are arranged so that they fold one edge of the paper in such a manner that the other edge overlaps it and is held together by means of the glue which has been applied by the glue-roller 10. The paper or web then passes through a pair of presser rollers 22 and 23. These rollers are supported at the inner end of the frame-work 1 in a suitable bearing structure.

The mechanism B of the machine provides suitable variable speed driving and transmission mechanism. This unit, as shown in Figs. 1 and 2 of the drawing, comprises the frame 25 in which is journalled the drive shaft 26 and the counter-shaft 27. At one end of the drive-shaft is the pulley 28 connected by belt 29 with the electric motor 30. At its other end the drive-shaft has the pulley 31 connected by belt 32 with the pulley 33 on the shaft of the lower feed roll 23. The variable speed transmission shown comprises the levers 34 and 35 pivoted on the frame 25 and connected at their ends respectively with the pulley disks 36, 37 and 38, 39, which disks are respectively slidable on the shafts 26 and 27. By means of a screw-rod 40, the levers are swung so as to vary the radius of engagement with the respective pulley disks of the belt 41, any speed of transmission being thus readily obtained between the driving shaft 26 and the counter-shaft 27. At the end of the counter-shaft 27 is a belt pulley 42 which is connected by an endless belt 44 to a pulley 43 which operates the new and improved cutting and perforating mechanism. It will be understood that the variable speed transmission shown may be replaced by any standard or suitable mechanism of this type.

The flattened paper tube, after having been pressed by the rollers 22 and 23, travels along a table or guide 45 to the new and improved cutting mechanism which comprises upper and lower rollers 46 and 47. These rolls are driven at different relative speeds so that the bars 48 and 49 will periodically register or coact to sever the strip. That is, for example, if the desired length passes between the cutter rolls during a series of five revolutions thereof, the bars will pass into registry and effect a cut once every five revolutions of the cutters.

The pulley 43 is secured at the front end of the shaft 50 which is journalled in the bearing structures 51 and 52 on the supporting framework 53. Between the bearing structures, the shaft supports the lower roll 47 of the cutting mechanism, the knife roll 46 being mounted on the shaft 53' journalled in the bearing structures 51 and 52 above the shaft 50. The cutter rolls are positively driven, the gear 54 on the shaft 50 meshing with the gear 55 on the knife roll shaft 53' (Fig. 5).

Below the shaft 50, the shaft 56 is journalled in the framework 53 and supports on its rear end the gear 57 which meshes with the gear 54 on the shaft 50. At its front end, the shaft 56 carries the gear 58 and also the sprocket pinion 59 (Figs. 4 and 5). The sprocket pinion is connected by the chain 60 with the large sprocket 61 secured on the outer end of the shaft 62 journalled in the framework 53. The shaft 56 supports also the sprocket wheel 63 which is connected by the chain 64 with the sprocket 65 on the shaft 66 journalled over the guide-plate 45 in brackets 67 and 68 extending from the upper part of the framework 53. Over the guide-plate 45, the shaft 66 supports the cylindrical brush 69 which engages with the tubular strip of paper coming from unit A, and keeps this band held flatly against the plate and also assists the feed rolls 22 and 23 in propelling the paper to the cutting mechanism. The brush serves also to clean any surplus glue from the band before it reaches the cutter mechanism.

The tubular paper strip travels along the plate 45 and first passes between the cutter rolls and then on to the table 70 on the framework 53, the table being at a little lower level than the end of the plate 45 (Fig. 4). After the paper has been cut or severed into lengths of desired size, the lengths are then transversely perforated or slitted so that they can be readily torn or separated into the wrappers or cartons W. The relative adjustment between the feed rolls 22 and 23 and the knife rolls is such that, after the proper length of folded strip has been fed through the cutter-rolls and onto the table 70, the cutter rolls will co-operate to cut the band, the folded band being thus cut at regular intervals and into lengths which are then slitted or perforated transversely. The length of the cut-off sections can be adjusted by the variable speed mechanism. The feed rolls 22 and 23 are driven at a constant speed from the motor 30, but the speed of rotation of the cutter rolls is determined by the setting of the variable speed mechanism B. If the speed of the cutter-rolls is increased, the interval of cutting will be shortened and the wrapper lengths will be shorter, while if the speed of the rolls is decreased, the interval between cutting is lengthened and the wrapper lengths will be correspondingly longer.

After a length has been cut from the folded band, it is placed in proper position on table 70 preparatory to further operation thereon. At the end of said table, an adjustable stop 71 determines the proper position of the length for further operation thereon. At the front end of the table, just behind the cutting rolls, a kicker 72 projects a distance above the table 70 and travels in the slot 73 in the table. This kicker is carried at the upper end of a rod 74 which extends upwardly from a cam-arm 75 pivoted on the framework 53 at 76. At its outer end, the cam-arm has the cam-roller 77 which engages the cam 78 secured on the shaft 62. This shaft 62 is driven from the shaft 50 through the transmission-train comprising the gears 54 and 57, shaft 56, chain 60 and sprocket wheel 61, the cutter rolls being also driven from the shaft 50. Just before each cutting operation, kicker 72 is held in its front position close to the cutter rolls by the weight of the arm 75. After a cutting operation, the severed length is still engaged for a while by the knife 48 and drops with its rear edge in front of the kicker 72. At this moment, the cam 78 rapidly rotates the cam-arm 75 with the result that the kicker 72 is rapidly operated and will kick or push the severed length along the table 70 until it strikes the stop 71. Above the table is supported a bar 79 from which a number of brushes 80 are suspended with their bristles in the path of the severed strip. These brushes resist the movement of the severed length by the kicker 72 sufficiently to prevent buckling thereof or escape from the table but do not interfere with the positioning of the lengths against the stop 71. The brushes also hold the lengths flatly against the table in transit to the slitting mechanism. Kicker 72 leaves the inner end of the length before the outer ends of the lengths engage the stop 71, to prevent buckling of the lengths.

The parts of the slitting and corrugating mechanism are mounted on the framework 81 adjacent to the framework 53 of the cutting mechanism. At the front of the framework near the top thereof are the bearing structures 82 and 83 in which are journalled the lower and upper shafts 84 and 85 on which are respectively secured the lower and upper cutting wheels 86 and 87. As shown in Fig. 8, the wheels have the co-operating cutting or shearing teeth 88 and 89 for cutting the short perforations or slits 90 in the strip length. The co-operating cutting teeth are in line with the table 70 which is extended rearwardly to the slitting wheels (Fig. 5). There may be any number of sets of slitting wheels and spaced as desired, depending upon the number of wrappers into which the lengths are to be divided.

For shifting the severed lengths from table 70 to the slitting wheels, I provide the chains or bands 91 which have propeller or abutment teeth 92 thereon. These chains (Figs. 5 and 8) travel around the front sprocket wheels 93 on shaft 94, and around the rear and lower sprocket wheels 95 and 96 respectively. The wheels 96 are on a shaft 97 below the shaft 94 and supported on cross-beam 98 of the frame-work 53. Rear sprocket-wheels 95 are secured on a shaft 99 which is journalled in the framework 81 behind the shaft 84 which carries the lower slitting wheels. The end of this shaft 99 carries the sprocket-wheel 100 which is connected by chain 101 with the sprocket wheel 102 on the short shaft 103 which supports the bevel gear 104 meshing with the gear 105 on the rear end of the shaft 50. The chains or belts 91 travel below the transverse slots 106 provided in the table 70, the upper ring of the chains being parallel with the table and the abutment teeth 92 projecting upwardly through the slots above the table-top to engage with the front edges of the severed lengths L arranged on the table by the kicker 72. Each length is received at its front edge by the abutment teeth and shifted rearwardly on table 70 underneath the presser and guide-fingers 107. The outer end of the length is also engaged by the guide arm 108 which keeps the other end of the length against the stop 71. Spring-fingers 107 press lightly on the lengths and retard the movement thereof to align the lengths which are not already straight for engagement by the teeth on the chains 91. Fingers 107 and the guide-arm 108 are adjustably secured from a bar 109 secured to the framework 81 above the level of table 70, the fingers and arm being clamped between the bar 109 and bar 110 secured to the bar 109 by screws 111. Fingers 107 extend rearwardly between the slitting wheel sets and the lengths are carried between the fingers and the chains and presented to the slitting wheels which cut the transverse rows of slits 90 in the lengths along which the lengths can be readily separated into wrappers or cartons W for containing the lamps or other objects to be wrapped or protected. After the slitting operation, the lengths are carried by the chains into position between the upper and lower crimping rolls 112 and 113 journalled on the framework 81 and yieldingly held together by compression springs 114.

The mechanism for driving the slitting rolls and the crimping rolls is operated by a motor 115 mounted on the framework 81. The motor pinion 116 meshes with a gear 117 on the shaft 118, which shaft supports also a pinion 119 which meshes with the gear 120 on shaft 121, this shaft supporting also the pinion 122 which meshes with the large gear 123 secured to the end of the lower crimping roll 113. The lower crimping roll is thus powerfully rotated, and the upper crimping roll meshes with the lower roll so it will be driven thereby.

The gear 124 on the lower crimping roll meshes with the idler gear 126 which in turn meshes with the gear 127 secured on the shaft 84 of the lower slitting wheels. Gear 127 meshes with the gear 128 on the shaft 85 for the upper slitting wheels. The slitting wheels and crimper rolls are thus driven from the motor 115. The finished slitted and crimped blanks are discharged from the machine by the crimping rolls and may be received in a suitable receptacle or by a conveyor-belt (not shown). The lengths are readily packed into compact form for shipment. When they are to be used, they are separated along the slit lines into the flat sections which can be readily opened for the insertion of lamps or other objects to be protected.

In order that the crimping rolls can more readily crimp or corrugate the lengths, they are preferably heated, and in Figs. 1 and 2 I show steam pipe s for controlling the application of steam to the rolls for heating them.

The operation of the machine will be as follows: The paper web, which may be of the form shown in Fig. 10, will be propelled and continuously fed to the cutting rolls 46 and 47 where, at predetermined intervals, lengths will be successively cut from the band and propelled by kickers 72 on the table 70 against the stop 71. Chains 91 then carry the successive lengths rearwardly underneath the spring fingers 107 and past the guide-arm 108, and through the sets of slitting wheels by which each length is transversely slit. The chains continue to carry the slitted length and feed it between the crimping rolls where the length is longitudinally corrugated and then eject it from the machine. When the lengths are separated along the slit lines, the respective lengths for cartons are ready for use and may be opened up for a lamp or other object which is then inserted. The new and improved mechanism for cutting, and slitting the folded bands is entirely automatic throughout the operation. Adjustment of the machine may be readily made. By adjusting the speed of the shaft 50, the speed of the cutting rolls and the lengths of the band sections cut off is adjusted. By arranging the slitting wheels, the lengths can be divided into any predetermined number.

While reference is made throughout the specification to the cutting and slitting of a flattened tube, it will be understood that any flat strip from a continuous web may be cut and slit by the invention.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In mechanism of the character described, the combination of a pair of rotatable members having coacting cutters, means for feeding a band longitudinally and at a constant speed between said members, means for constantly rotating both of said members to cause the cutter to cut the band into sheets, means for varying the speed of said rotating means to vary the length of the sheets, means for receiving the sheets and conveying them laterally, and means for perforating said sheets transversely, operable during the lateral movement of said sheets.

2. In mechanism of the character described, the combination of cutting mechanism, means for longitudinally feeding a band through said cutting mechanism, said cutting mechanism being adapted to periodically cut said band so as to form lengths, carrier mechanism for receiving the lengths and conveying them laterally, and perforating members, said conveyor mechanism carrying said lengths through said perforating members whereby said lengths are perforated transversely to form lines along which said lengths may be separated into wrappers.

3. In mechanism of the character described, the combination of cutting mechanism, means for longitudinally feeding a band in the form of a closed flattened tube through said cutting mechanism, said cutting mechanism being adapted to periodically cut said band so as to form lengths, carrier mechanism for receiving the lengths and conveying them laterally, and rotary perforating members, said conveyor mechanism carrying said lengths through said perforating members whereby said lengths are perforated transversely to form lines along which said lengths may be separated into wrappers.

4. In mechanism of the character described, the combination of a table, cutting mechanism at one end of said table, means for continuously feeding a strip through said cutting mechanism and onto said table, said cutting mechanism being adapted to periodically cut said band transversely so as to form lengths, conveyor mechanism below said table for receiving the lengths and for conveying them laterally, and perforating members through which said lengths are carried by said conveyor mechanism, said perforating mechanism perforating said lengths transversely to form weakened lines along which said lengths may be separated into wrappers.

5. In mechanism of the character described, the combination of a table, cutting mechanism at one end of said table, means for continuously feeding a strip through said cutting mechanism and onto said table, said cutting mechanism being adapted to periodically cut said band transversely so as to form lengths, conveyor mechanism below said table for receiving the lengths and for conveying them laterally, and rotary perforating members through which said lengths are carried by said conveyor mechanism, said perforating mechanism perforating said lengths transversely to form weakened lines along which said lengths may be separated into wrappers.

6. In mechanism of the character described, the combination of a table, cutting mechanism at one end of said table, feeding mechanism for longitudinally feeding a band through said cutting mechanism and onto said table, said cutting mechanism being adapted to periodically cut said band so as to form lengths, an aligning stop on said table, pusher mechanism for pushing severed lengths against said stop, conveyor mechanism below said table engaging with and laterally conveying said lengths from said table, and members in the path of said conveyor mechanism through which the lengths are carried and transversely perforated.

7. In mechanism of the character described, the combination of a table, cutting mechanism at one end of said table, feeding mechanism for longitudinally feeding a band through said cutting mechanism and onto said table, said cutting mechanism being adapted to periodically cut said band so as to form lengths, an aligning stop on said table, means for positioning said lengths on said table against said stop, means for yieldingly holding said lengths after aligning thereof, conveyor mechanism below said table engaging with and laterally conveying said lengths from said table, and members in the path of said conveyor mechanism through which the lengths are carried and transversely perforated.

8. In mechanism of the character described, the combination of a table, cutting mechanism at one end thereof, feeding mechanism for longitudinally feeding a band through said cutting mechanism and onto said table, said cutting mechanism being adapted to periodically cut said band so as to form lengths, an aligning stop on said table, means for positioning said lengths on said table against said stop, conveyor mechanism having projections for engaging the lengths to shift them laterally on said table, means for yieldingly holding said lengths on said conveyor mechanism, and means in the path of said conveyor mechanism and through which the lengths are carried for transversely perforating said lengths.

9. In mechanism of the character described, the combination of cutting mechanism, feeding mechanism for longitudinally feeding a band through said cutting mechanism, said cutting mechanism being adapted to periodically cut said band so as to form lengths, a table for receiving said lengths, conveyor mechanism traveling laterally from said table, means for shifting the severed lengths on said table into alignment relative to said conveyor mechanism, means for yieldingly holding said lengths on the table after alignment thereof, spring fingers for holding said lengths against said conveyor mechanism, and means in the path of said conveyor mechanism for transversely perforating said lengths.

Signed at Chicago, Illinois, this 3rd day of December, 1923.

BERG HEINRICHS.